Mar. 20, 1923.
A. KING.
1,449,289.
DEVICE FOR ALIGNING THE WHEELS OF MOTOR CARS AND LIKE VEHICLES.
FILED AUG. 1, 1922.
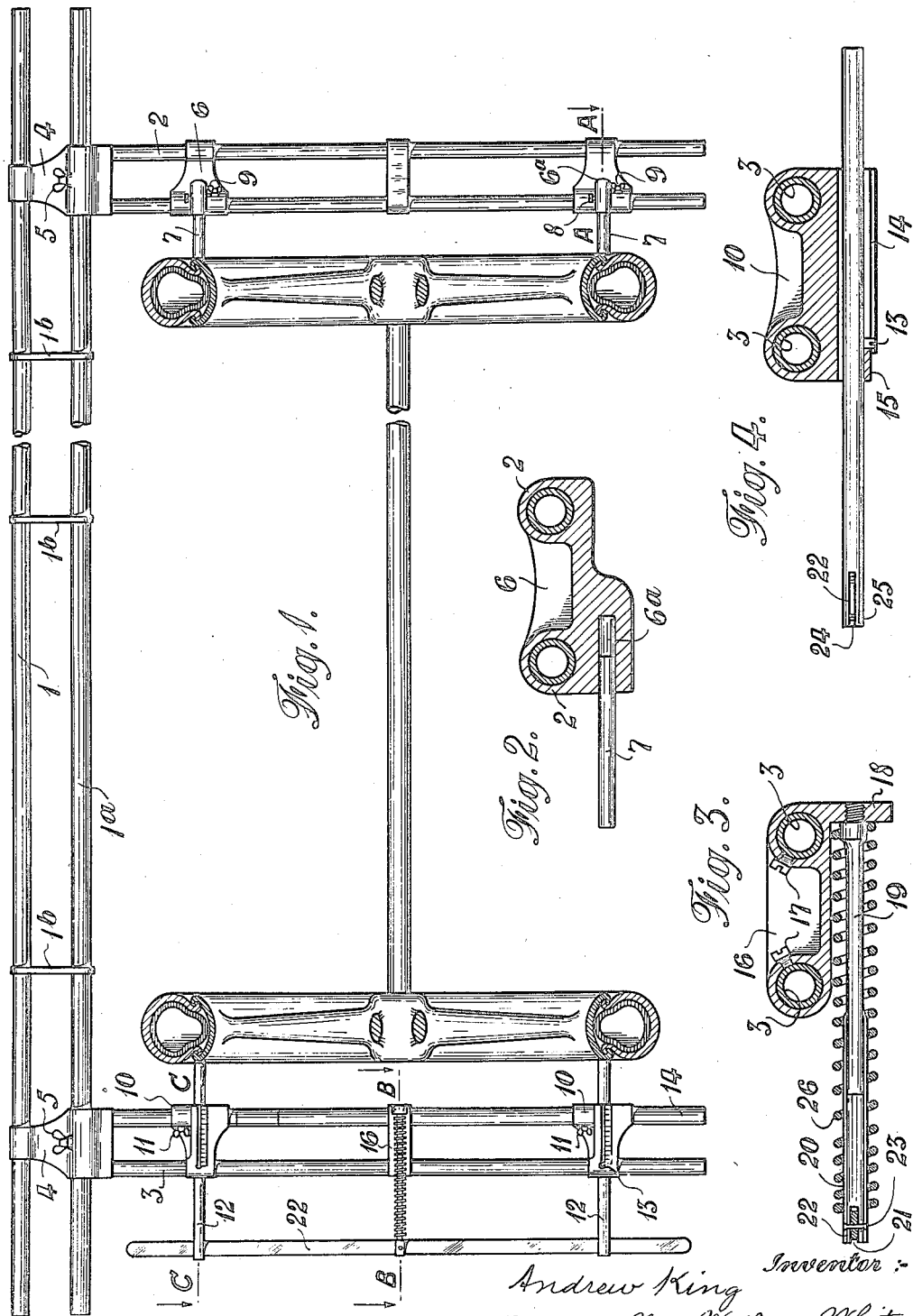

//UNITED STATES PATENT OFFICE.

ANDREW KING, OF WEST BRIDGFORD, ENGLAND.

DEVICE FOR ALIGNING THE WHEELS OF MOTOR CARS AND LIKE VEHICLES.

Application filed August 1, 1922. Serial No. 578,996.

*To all whom it may concern:*

Be it known that I, ANDREW KING, a subject of the King of Great Britain, residing at 96 Trent Boulevard, West Bridgford, in the county of Nottingham, in England, have invented a new or Improved Device for Aligning the Wheels of Motor Cars and like Vehicles, of which the following is a specification.

This invention comprises a new or improved device for aligning the wheels of motor cars and like vehicles, the object of the invention being to provide easily operable means for quickly and accurately testing and setting into alignment vehicle wheels such as the wheels of automobiles, thereby ensuring such wheels being mounted in true parallelism so as to run in perfectly parallel planes.

The device according to the present invention comprises a plurality of arms disposed in parallel planes and a plurality of elements or parts projecting from said arms and adapted to make contact with the wheels to be aligned or tested, indicating means being provided whereby, when the device is in the operative position, any inaccuracy in the parallel alignment of the wheels is immediately and accurately ascertained by a single operative movement of the device.

Preferably the parallelly disposed arms carrying the wheel contact elements are mounted upon and project from a bar or tube, one or more of said arms being adjustably displaceable upon said bar or tube.

For the purpose of more fully describing the nature of this invention, reference will now be made to the accompanying drawings, wherein:—

Fig. 1 is a plan view of a device according to this invention illustrating same in the operative position relative to a pair of wheels.

Fig. 2 is a sectional detail view on line A—A of Figure 1 drawn to a larger scale.

Fig. 3 is an enlarged sectional detail view on line B—B of Figure 1.

Fig. 4 is an enlarged sectional detail view on line C—C of Figure 1.

In one method of carrying out the invention, a true bar or tube 1 is provided, the length of which is greater than the distance between a pair of wheels to be aligned or tested. The bar preferably comprises two rods or tubes 1, 1ª, connected together in spaced parallel relationship to each other by cross pieces 1ᵇ. At or near the one end of the bar 1 is mounted a branch arm 2, a second arm 3 being mounted at or near the other end of said bar 1. These two branch arms 2 and 3 are each preferably composed of two parallelly spaced rods or tubes of circular section and are mounted upon the bar 1 by means of bracket members 4 within which one end of the two arms 2 and 3, respectively, is immovably fixed. These brackets 4 have two parallelly disposed holes therethrough for accommodating the two members 1ª of which the bar 1 is composed, either or both of said brackets being slidable upon the bar 1, and being adjustably secured thereon by means such as the set screw 5.

On the one branch arm 2 two brackets 6 are slidably assembled, each bracket 6 carrying a comparatively short rod or the like 7 projecting at right angles from the arm 2. These short rod members may conveniently be accommodated within tubular sockets 6ª and secured therein by set screws 8, care being taken that the two rod members 7 project out to an equal extent from the arm 2. The ends of the projecting rods 7 are adapted to come into contact with the rim of one of the wheels being aligned or tested, at diametrically opposite positions in said rim, the sliding brackets 6 being adjustably secured by means as set screws 9 at any desired position in the length of the arm 2 so as to adjust the relative positions of the wheel-contact rods 7 to suit varying diameters of wheels.

The second branch arm 3 has two brackets 10 slidably mounted thereon and adjustably fixed by set screws 11. Each bracket 10 has a circular aperture extending through same in a direction at right angles to the arm 3 and within said aperture a wheel-contact rod 12 is slidably assembled. Each rod 12 has a small lug or pin 13 projecting up therefrom, said lug being adapted to project through and slidably traverse a slot 14 formed in the upper faces of the brackets 10, which upper faces are preferably flat. On these flat faces of the brackets 10 a suitable scale or other graduation marks is or are provided, the upper face of each lug 13 being also formed with an index mark. The slot 14 is discontinued near the one end of the bracket so as to form a stop 15 for lug 13.

At a position between the two brackets 10, advantageously midway in the length of the arm 3 is another bracket 16, which bracket can be fixed in position by one or more set screws 17. This bracket has an upstanding portion 18 having screwed or otherwise fixed therein a spindle 19 over which a tube 20 is adapted to telescopically fit. The outer end of this tube is slotted as at 21, and within this slot a flat lever 22 is pivotally secured midway in its length by pin or rivet 23. The lever 22 is also accommodated within slots 24 in the outer ends of the sliding wheel-contact rods 12, said lever being retained within said slots by suitable means such as rivets 25.

Surrounding the spindle 19 and tube 20 is a light spring 26 bearing on the one hand upon the upstanding part 18 of bracket 16, and on the other hand upon the inner side of lever 22. This spring normally retains the lever 22 and the two sliding rods 12 in their outermost position, in which position the index mark on each lug 13 points to the zero mark on its respective scale.

In utilizing the device as before described, the one branch arm 2 is brought into position with the wheel-contact rods 7 bearing upon the outer side of the one wheel rim, and the other arm 3 is slidably moved along the bar 1 until one of the sliding wheel-contact rods 12 comes into contact with the outer side of the other wheel rim. If the wheels are accurately aligned, both the sliding rods 12 will simultaneously contact the wheel rim without any movement of either rod in its bracket 10, and each index mark will register with zero. If, however, only one of said contact rods 12 touches the rim, then the wheels are not parallelly aligned, and the exact degree of inaccuracy can be immediately ascertained by sliding that rod 12 not touching the wheel rim inwardly within the bracket 10 against the resistance of spring 26 until said rod contacts said wheel rim, and reading off the position occupied by the index mark on the pin 13 relative to the scale on the bracket.

The wheel-contact rods 7 and 12 normally project inwardly from the arms 2 and 3 to an extent sufficient to keep said arms clear of the projecting wheel hub caps.

If desired each of the arms 2 and 3 may be suitably marked so as to indicate the exact position at which the brackets 6 and 10 should be fixed when the device is being employed in connection with any of the several standard diameters of wheels.

I claim:—

1. A device for aligning and testing the alignment of vehicle wheels comprising a bar, a plurality of arms in parallel planes carried thereby, projections carried by said arms, the said arms and projections movable longitudinally with respect to the members carrying same.

2. A device for aligning and testing the alignment of vehicle wheels comprising a bar, a plurality of arms in parallel planes slidably mounted thereon, projections carried by said arms, said projections slidable in the direction of the length of the arms.

3. A device for aligning and testing the alignment of vehicle wheels comprising a bar, a plurality of arms in parallel planes slidably mounted thereon, projections carried by said arms, said projections slidable in the direction of the length of said arms and the projections carried by one arm resiliently displaceable in transverse relation thereto.

4. A device for aligning and testing the alignment of vehicle wheels comprising a bar, a plurality of arms in parallel planes slidably mounted thereon, projections carried by said arms, said projections slidable in the direction of the length of said arms, the projections carried by one arm displaceable in transverse relation thereto, and a spring pressed lever connecting the said projections.

5. A device for aligning and testing the alignment of vehicle wheels comprising a bar, a plurality of arms in parallel planes slidably mounted thereon, projections adapted to make contact with the wheels to be aligned carried by said arms, said projections slidable in the direction of the length of said arms, the projections carried by one arm displaceable in transverse relation thereto, a lever connecting the displaceable projections, a sleeve about which the lever is fulcrumed, a pin carried by the arm, said sleeve accommodating and axially moveable with respect to the pin carried by said arm and normally retained in the remote position therefrom and a spring mounted upon said sleeve and pin and compressed between said arm and lever.

6. A device for aligning and testing the alignment of vehicle wheels comprising a bar, a plurality of arms in parallel planes slidably mounted thereon, projections adaped to make contact with the wheels to be aligned carried by said arms, said projections slidable in the direction of the length of said arms, the projections carried by one arm displaceable in transverse relation thereto, pins carried by said latter projections accommodated within slots formed in said arm, there being slots formed at the ends of the displaceable projections remote from the ends adapted to make contact with the wheels to be tested, a lever accommodated and retained within said last mentioned slots, said lever centrally fulcrumed and spring pressed.

7. A device for aligning and testing the alignment of vehicle wheels comprising a bar involving a plurality of tubes joined by cross pieces, bracket members slidable on said tubes, fastening means for the same, a plurality of rods constituting arms positioned within said members and extending at right angles to the direction of length of the said tubes, bracket members slidable on said rods and fastening means for the same, projecting members carried by the said latter brackets and retained at right angles to the direction of length of said arms, the projections on the brackets of one arm slidable relative thereto, the said latter projections having slots therein, a lever carried in the slots and connecting the projections, pins in the projections for retaining said lever, a sleeve carried by the lever and about which the lever is centrally fulcrumed, a pin carried by the arm and having slidable engagement with the sleeve, a compression spring surrounding said pin and sleeve to normally urge the lever away from the arm, the brackets carrying the projections movable relative thereto being provided with graduated slots, and indicating pins carried by said projections and slidable within the slots to enable the graduation to be read off with respect to the indicating pins accommodated within said slots and carried by the projections.

ANDREW KING.

Witnesses:
 ERIC SOTTER,
 FRANK AUGUSTUS DADY.